United States Patent [19]

Bumgardner

[11] Patent Number: 4,562,988
[45] Date of Patent: Jan. 7, 1986

[54] VIDEO DISPLAY MOUNTING MECHANISM PROVIDING PIVOTING AND TILTING OF THE DISPLAY

[75] Inventor: Donald L. Bumgardner, South Lyon, Mich.

[73] Assignee: Northern Telecom Limited, Montreal, Canada

[21] Appl. No.: 625,258

[22] Filed: Jun. 27, 1984

[51] Int. Cl.[4] .......................................... F16M 11/12
[52] U.S. Cl. .................................. 248/349; 248/371; 248/183
[58] Field of Search ............... 248/349, 371, 183, 184, 248/185, 346, 349, 181

[56] References Cited

U.S. PATENT DOCUMENTS

| | | | |
|---|---|---|---|
| 3,970,792 | 7/1976 | Benham et al. .................. | 248/183 X |
| 4,019,710 | 4/1977 | O'Connor et al. .................. | 248/181 |
| 4,068,961 | 1/1978 | Ebner et al. ..................... | 248/181 X |
| 4,354,654 | 10/1982 | Werner et al. .................... | 248/181 X |
| 4,368,867 | 1/1983 | Pendleton et al. .............. | 248/346 X |
| 4,410,159 | 10/1983 | McVicker et al. . | |
| 4,415,136 | 11/1983 | Knoll ................................ | 248/181 |
| 4,483,503 | 11/1984 | Gahan ............................... | 248/349 |
| 4,533,105 | 8/1985 | Cornwell, Jr. et al. ............ | 248/371 |

Primary Examiner—Ramon S. Britts
Assistant Examiner—Karen Chotkowski
Attorney, Agent, or Firm—Schwartz, Jeffery, Schwaab, Mack, Blumenthal & Evans

[57] ABSTRACT

A mechanism for mounting a video display unit (or the like) to a base unit is disclosed. The mechanism includes a ball-shaped (or partial sphere-shaped) portion which mounts to the bottom of the display unit. The base carries a circular bevelled rim-shaped member for mating with, and providing support for, the ball-shaped member. A slot in the ball-shaped member carries a sliding member. A stud, fixed to the base unit, passes through the sliding member such that pivoting of the display unit occurs about the axis of the stud. Tilting occurs by the display unit moving relative to the sliding member (i.e. the sliding member moves in the slot). Consequently, tilting is provided about an axis orthogonal to the axis of the stud.

3 Claims, 17 Drawing Figures

VIDEO DISPLAY MOUNTING MECHANISM PROVIDING PIVOTING AND TILTING OF THE DISPLAY

BACKGROUND OF THE INVENTION

This invention relates generally to to the mounting of video display units, such as cathode-ray tubes (CRT). The invention relates more particularly to a mounting mechanism providing both a pivoting (swivelling) action of the display unit, and a tilting action of the display unit.

The prior art contains many ways of providing a mount for a video display unit, and provides many ways of providing movement of the display unit, to allow it to be adjusted by an operator for viewing. Examples of some of these prior art mounting arrangements can be found in the following U.S. Patents: U.S. Pat Nos. 4,410,159 dated Oct. 18, 1983 by H. J. McVicker et al; 4,068,961 dated Jan. 17, 1978 by J. S. Ebner et al; 3,970,792 dated July 20, 1976 by E. E. Benham et al; and 4,019,710 dated Apr. 26, 1977 by C. O'Connor et al.

Aforementioned U.S. Pat. No. 4,410,159 provides a moulded base element having a pair of concave tracks in the top and an annular recess in the bottom, the concave tracks receive and support a moulded cradle element adapted to contain and support a CRT therein. The annular recess receives an annular support ring adapted to support said base and said cradle. The three assembled CRT support elements are maintained in contact with each other by gravity and are provided with keepers to assure the assembly does not come apart (see col. 1, line 65 to col. 2, line 7 of that patent).

In aforementioned U.S. Pat. No. 4,068,961 a swivel top mounts to the object to be provided with controlled movement. A swivel bottom mounts to a support. The swivel top and bottom are held together by a large, curved wafer and a nut and bolt arrangement. The swivel top and bottom interact with each other to provide controlled limited movement in the two orthogonal planes, simultaneously (from the abstract of that patent).

Aforementioned U.S. Pat. No. 4,019,710 describes an instrument support levelling socket having relatively adjustable parts with interfitting spherical sectioned surfaces in which one of the surfaces is defined by a plurality of spaced feet so that the surface is sectioned and separated by substantial clearance spaces. A locking knob threaded into one of the parts and sandwiching the other selectively clamps the surfaces together against relative movement (from the abstract of that patent).

SUMMARY OF THE INVENTION

The present invention is directed to providing a mechanism of relatively simple construction for allowing both the pivoting (swivelling) and tilting of a display unit. In accordance with the present invention, and described in simplistic terms, the mounting arrangement of the present invention involves mounting, under the video display unit, a generally ball-shaped (or partial sphere-shaped) object and having it rest on a mating component carried by a base unit. As can be imagined, this ball and socket type of arrangement provides for a large degree of movement of the video display unit, both in pivoting, which would of course be about a generally vertical axis, and also in tilting, which would of course be about a generally horizontal axis.

Such an arrangement would be prone to fall apart if there were nothing more to hold the display unit to the base unit. To prevent this from happening the present invention incorporates a rectangular slot in the ball unit attached to the display unit. A stud and a slider are carried by the base unit. The stud is firmly mounted to the base unit, and the slider can pivot about the stud. The slider, as its name implies, slides along the slot in the ball unit, thus allowing the display unit to be tilted. The pivoting action is allowed by the stud as will be described later in more detail. It should be noted that the slider is pivotally mounted to the stud and is in a captive arrangement with the stud. Consequently, the combination of the base unit, the stud and slider, and the ball unit of the video display, are all held in a captive arrangement.

Stated in other terms, the present invention is a mechanism for mounting an upper unit to a lower unit so as to allow relative motion between the two units along two generally orthogonal axes of rotation, the mechanism comprising: a partial sphere-shaped member protruding from the lower part of the upper unit; the partial sphere-shaped member containing a slot in which is held, in a moving relationship, a slider means for traversing the slot from one end to another, the slider means having an aperture therein; a circular rim-shaped member protruding from the upper part of the lower unit, for mating with the partial sphere-shaped member; a stud means located within the periphery of the rim-shaped member, and fixed to the lower unit, the stud means passing through the aperture in the slider means and joined to the slider means so as to allow the slider, and consequently the upper unit, to pivot about the stud means, whereby the upper unit is supported by the rim-shaped member engaging the partial sphere-shaped member, the upper unit pivots about the stud means, the upper unit tilts by moving relative to the slider means, and the upper unit and the lower unit are in a captive arrangement; wherein the slider means is constructed so as to fit the slot such that a first part of the slider means is on a first side of the slot, a second part of the slider means is on a second side of the slot, and a third part of the slider means passes through the slot and joins the first part of the slider means to the second part of the slider means; and a bearing surface on the first part of the slider means mates against a bearing surface on a first surface of the partial sphere-shaped member, and a bearing surface on the second part of the slider means mates against a bearing surface on a second surface of the partial sphere-shaped member.

BRIEF DESCRIPTION OF THE DRAWINGS

The invention will now be described in greater detail with reference to the accompanying drawings, wherein like parts in each of the several figures are identified by the same reference character, and wherein;

FIG. 7b is a plan view of the base unit of FIG. 7a taken through the view line 7b—7b of FIG. 7a;

DETAILED DESCRIPTION

Figure 1:
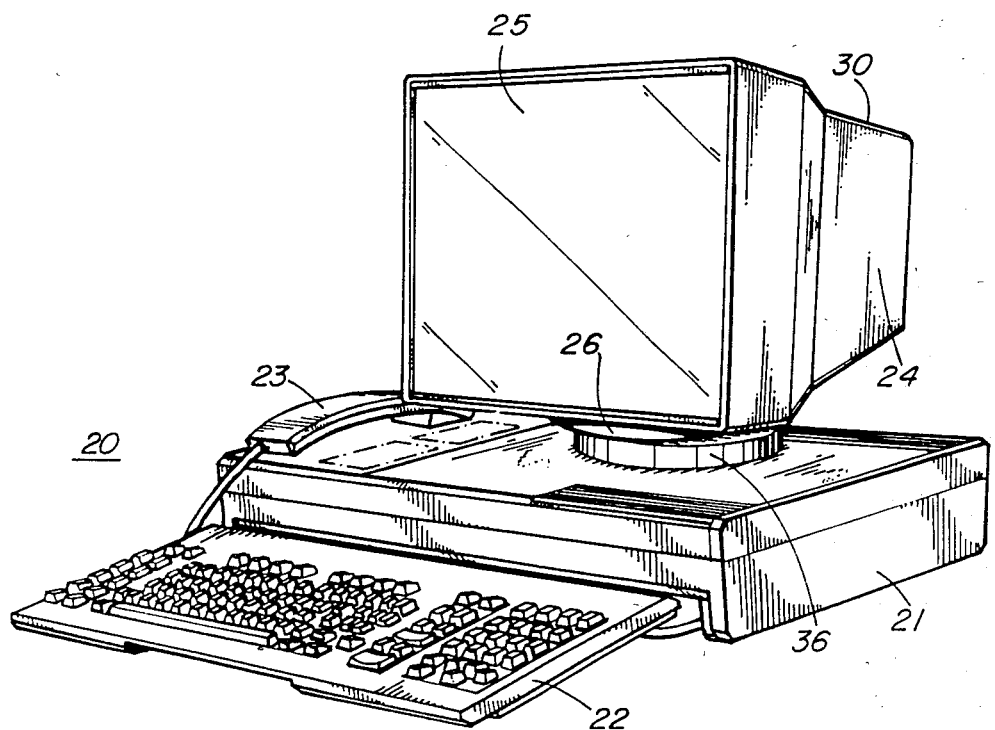
FIG. 1 is a perspective view of a display unit mounted to a base unit and including a keyboard.

FIG. 1 depicts a combined voice/data display unit 20. It is comprised of a base unit 21, a keyboard 22, a telephone handset 23, and a video display unit 24. Display unit 24 comprises a cathode-ray tube (CRT) 25 contained within a housing 30. The present invention is directed to mounting display unit 24 to base unit 21 and at the same time, to allow display unit 24 to pivot and to tilt relative to base unit 21.

Figure 2:
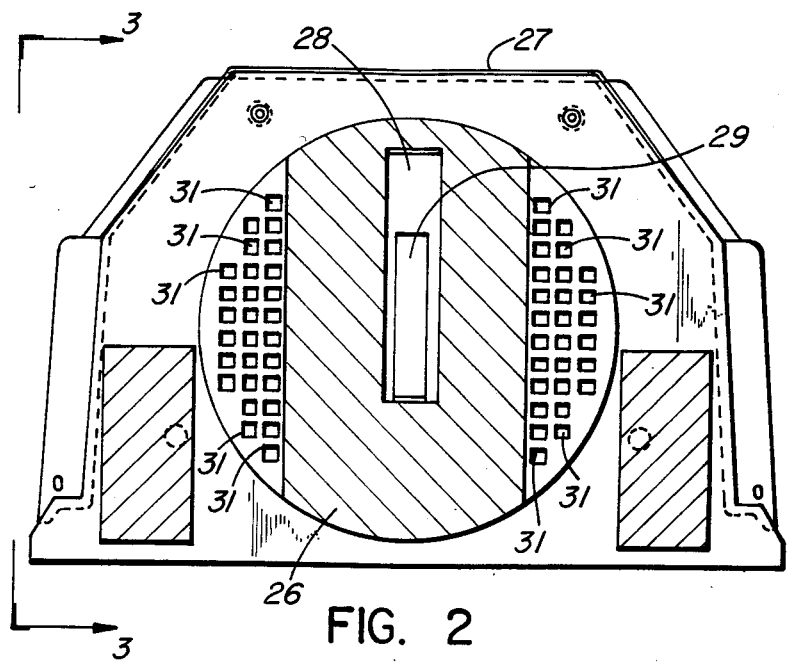
FIG. 2 is a plan view of the outside of the bottom cover of the display unit of FIG. 1.
Figure 3:
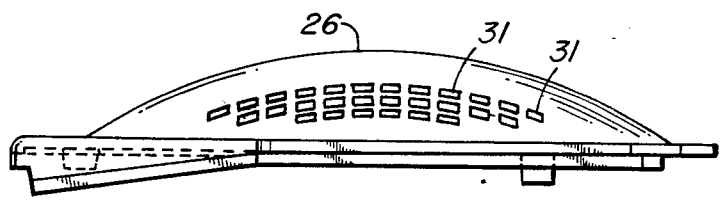
FIG. 3 is a side view of the FIG. 2 embodiment, taken along a view line 3—3 of FIG. 2.

Attention is directed to FIG. 2 which depicts in more detail a portion of bottom cover 27 of display unit 24. As can be seen in FIG. 2, cover 27 includes a large circular area indicated as partial sphere 26, which is better seen in FIG. 3, to which attention is also directed. The FIG. 2 view also depicts a recessed portion 28, and a slot 29. The function of these two items will be described later in greater detail. Also depicted in FIGS. 2 and 3 are a plurality of rectangular squares, referenced generally as 31. These squares 31 are openings in partial sphere 26 to allow for the movement of air.

Figure 4:
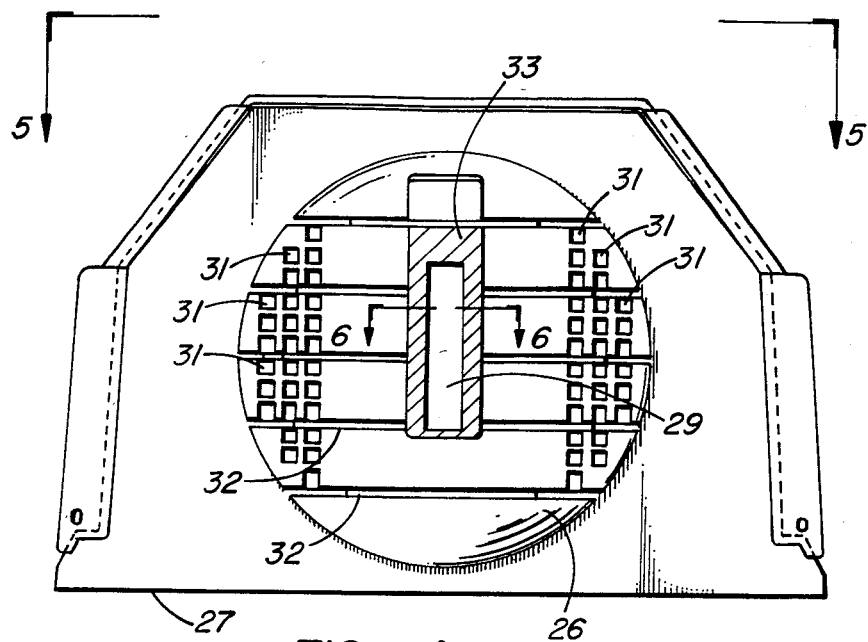
FIG. 4 is a plan view of the bottom cover of the display unit depicting the opposite side to that shown in FIG. 2.

FIG. 4 depicts the opposite side of bottom cover 27 as does FIG. 2. In the FIG. 4 view, partial sphere 26 is concave in shape. Cover 27, as shown in FIG. 4, also of course has slot 29. It additionally has support ribs 32, and it has a bearing surface 33, indicated in FIG. 4 by the shaded surface area. It should be noted that bottom cover 27 is made of phenylene oxide-based resin.

Figure 5:
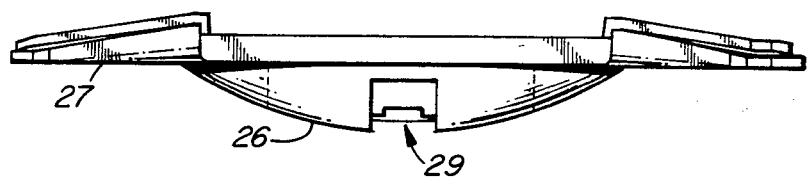
FIG. 5 an end view of the bottom cover of FIG. 4 taken through view lines 5—5 of FIG. 4.

FIG. 5 depicts an end elevational view of cover 27 taken through the view line 5—5 of FIG. 4. In FIG. 5, the curved surface of the partial sphere 26 is visible, as is slot 29.

Figure 6:
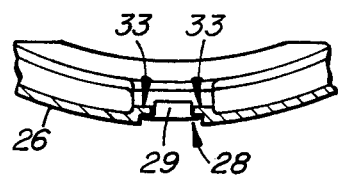
FIG. 6 is a sectional view of a portion of the bottom cover of FIG. 4 taken the Section line 6—6 in that Figure.

FIG. 6 is a sectional view of a part of FIG. 4, as indicated by the Section lines 6—6 in FIG. 4. FIG. 6 depicts a portion of the partial sphere 26 showing slot 29, bearing surfaces 33 and recessed portion 28.

Figure 7A:
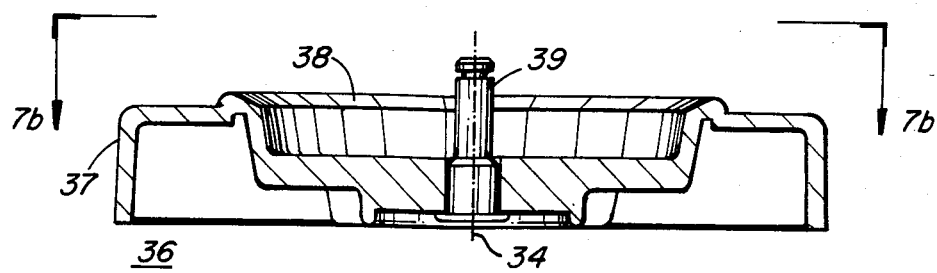
FIG. 7a is a partial elevational view of a section of the base of the unit depicted in FIG. 1.
Figure 7B:
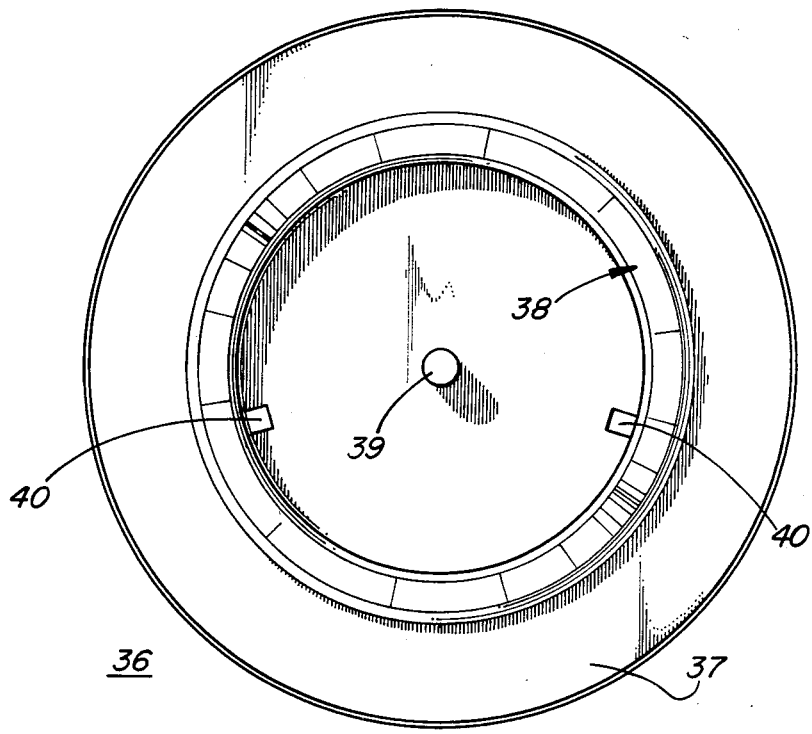

FIGS. 7a and 7b depict socket assembly 36, a part of base unit 21, for receiving partial sphere 26. FIG. 7a is a sectional view of socket assembly 36, and FIG. 7b is a plan view of socket assembly 36 taken through the view lines 7b—7b of FIG. 7a; they will be referenced simultaneously. Socket assembly 36 comprises a housing 37, having formed therein a bevelled circular rim 38 upon which partial sphere 26 can rest. Also depicted in FIGS. 7a and 7b is stud 39. Stud 39 forms the axis about which partial sphere 26, and consequently, display unit 24 (FIG. 1), rotates (i.e. pivots). It should be noted that socket assembly 36 is made of phenylene oxide. Note also that stops 40 limit the pivoting movement of display unit 24 (FIG. 1). In operation, lip 50 of slider 44 will contact one of the stops 40 so as to prevent complete rotation (i.e. 360°) of slider 44 and consequently of bottom cover 27 and display unit 24. As shown in FIG. 7b, rotation of approximately 200° is permitted.

Figure 8:
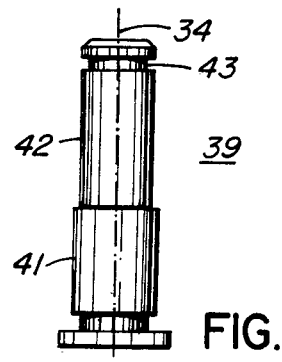
FIG. 8 depicts the stud of FIG. 7a in more detail.

FIG. 8 depicts stud 39 in more detail. As can be seen from FIG. 8, stud 39 comprises a ribbed or grooved portion 41, which permits stud 39 to be fixed to housing 37. Stud 39 then has a smooth shank portion 42, of reduced diameter, relative to grooved portion 41. It then contains a necked down portion 43 for receiving a retaining means, such as a C-clip. Stud 39 is made of metal (e.g. steel).

Figure 9:
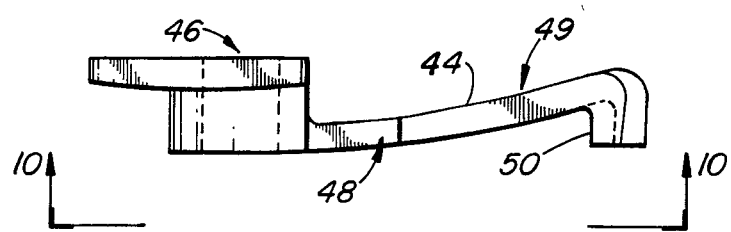
FIG. 9 is an elevational view of the slider used in conjunction with the stud of FIG. 8.
Figure 10:
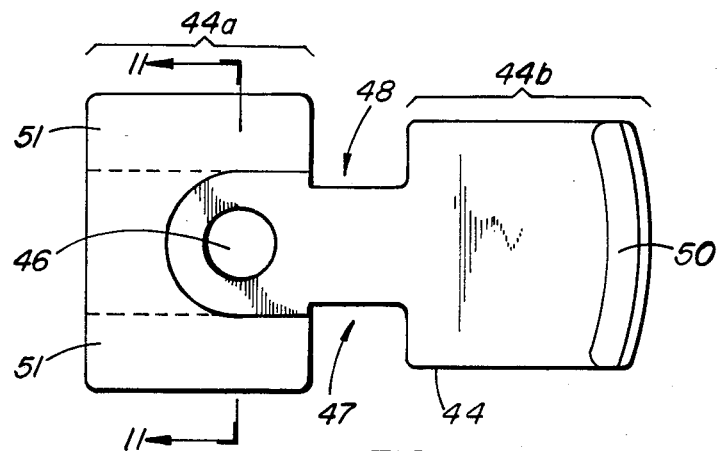
FIG. 10 a plan view of the slider of FIG. 9, taken along the view lines 10—10 FIG. 9.

FIGS. 9 and 10 depict slider 44. FIG. 9 is a side elevational view of slider 44 and FIG. 10 is a plan view of slider 44, taken along view lines 10—10 of FIG. 9. Slider 44 contains a hole or opening 46 through which stud 39 of FIGS. 7a and 7b can pass so as to provide a fit that permits relative motion between stud 39 and slider 44. Notches 47 and 48 in slider 44 allow slider 44 to be inserted into slot 29 of partial sphere 26. Areas 51, on slider 44, are bearing surfaces which mate against the bearing surfaces 33, indicated in shaded lines, on FIG. 4 (when assembled). Slider 44 contains bearing surface 49 which mates against the surface of recessed portion 28 (FIG. 2) when in operation, and a lip 50. To aid in the description, the part of slider 44 to the left of notches 47 and 48 (as viewed in FIG. 10) will be referenced as slide 44a and that portion to the right of notches 47 and 48 (in FIG. 10) will be referenced as slide 44b.

Figure 11:
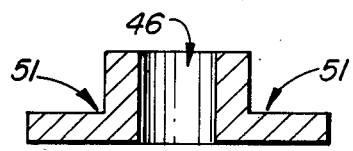
FIG. 11 a sectional view of the slider of FIG. 10 taken along the Section lines 11—11.

FIG. 11 is a sectional view of a portion of slider 44 depicting the hole 46.

Figure 12:
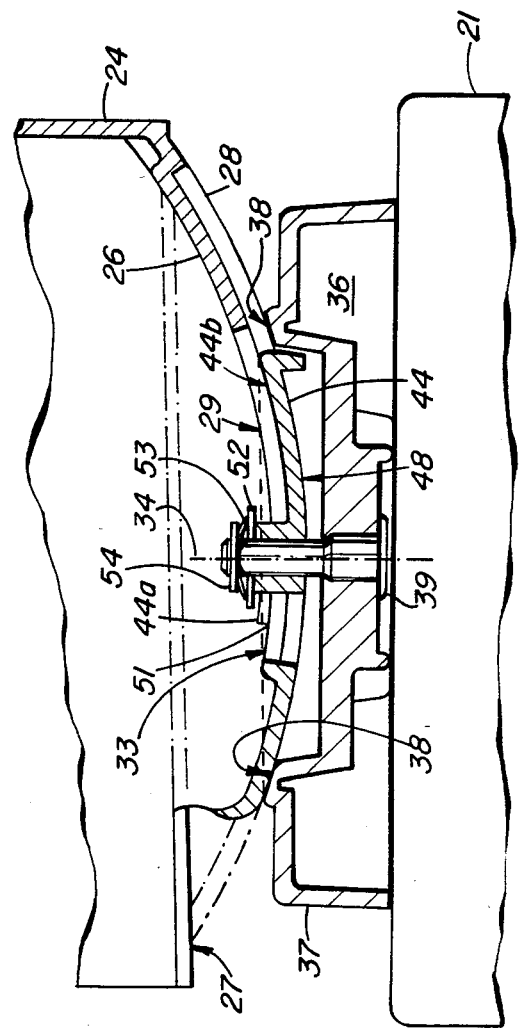
FIG. 12 similar to FIG. 7a but shows the ball unit of the display unit as well the slider and its attachment hardware.

FIG. 12 is a partial sectional view of the FIG. 1 embodiment, taken along a section corresponding to that shown in FIG. 7a. As can be seen from FIG. 12, display unit 24 is depicted connected to its bottom cover 27, which has the partial sphere 26. Base unit 21 is depicted supporting socket assembly 36. The interaction of socket assembly 36 and partial sphere 26 can be seen from FIG. 12. Partial sphere 26 rests on the bevelled circular rim 38 of socket assembly 36. Pivotal movement of display unit 24 is about the longitudinal axis 34 of stud 39. As can be seen from FIG. 12, stud 39 passes through hole 46 in slider 44, and is maintained in position by washer 52, spring 53 and C-clip 54. Slider 44 mates with slot 29 such that the portion of slider 44, that is to the left of notches 47 and 48 in FIG. 10 (i.e. slide 44a) is above slot 29 in FIG. 12, and that portion of slider 44, that is to the right of notches 47 and 48 (i.e. slide 44b) is below slot 29 in FIG. 12. Bearing surfaces 51 of slider 44 bear against bearing surfaces 33 of partial sphere 26. As can be seen from FIG. 12, slider 44 becomes lodged in slot 29. This longitudinal movement allows the display unit 24 to tilt. The amount of the tilt is of course limited by the length of slot 29. The part of slider 44 that is below partial sphere 26 in FIG. 12 (i.e. slide 44b) bears against the recess portion 28 of partial sphere 26.

FIGS. 13, 14, 15, and 16 depict a variation on the design just described, in that they illustrate how a detent function can be added to the tilting feature of the present invention.

Figure 13:
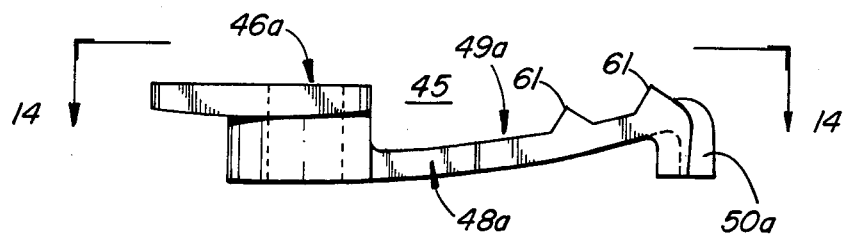
FIG. 13 is similar to FIG. 9, but depicts a variation thereof.
Figure 14:
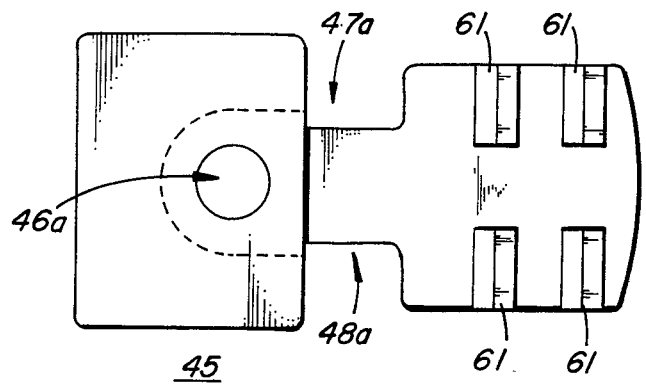
FIG. 14 is a plan view of the slider of FIG. 13, taken along the view lines 14—14 in FIG. 13.

FIG. 13 depicts a slider 45 that is identical to slider 44 of FIG. 9 except that it additionally includes projections 61. It also includes a hole 46a, notches 47a and 48a, lip portion 50a and bearing surface 49a. FIG. 14 is a plan view of slider 45 taken through the view line 14—14 of FIG. 13.

Figure 15:
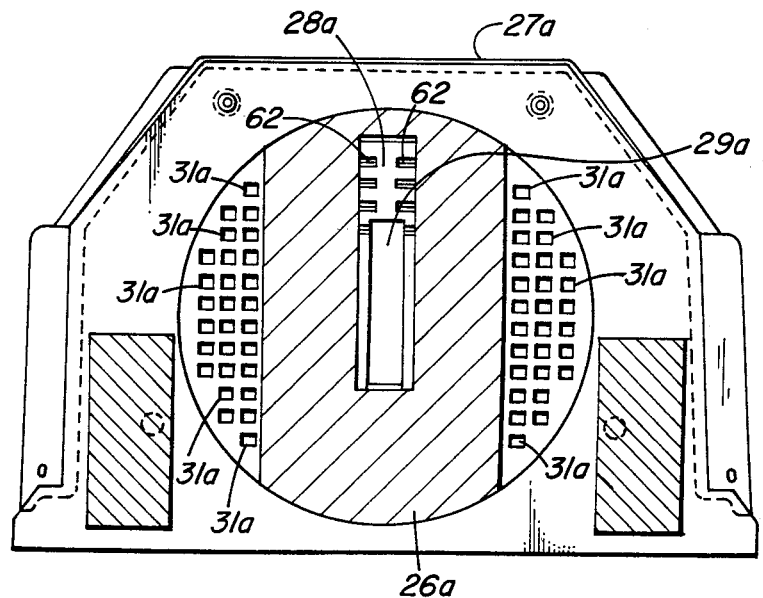
FIG. 15 is similar to FIG. 2, but depicts a variation thereof.

FIG. 15 depicts bottom cover 27a which is the same as cover 27 of FIG. 2 except for the addition of notches 62 to recessed portion 28a.

Figure 16:
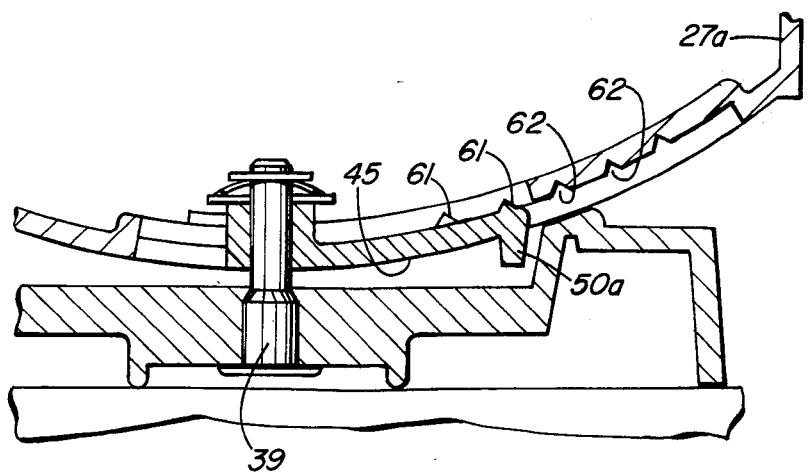
FIG. 16 is similar to FIG. 12 but is more simplified and depicts a variation thereof.

FIG. 16 is similar to FIG. 12, but depicts how slider 45 (in lieu of slider 44) interacts, and depicts bottom cover 27a (in lieu of cover 27). As can be seen in FIG. 16, as slider 45 moves to the left, projections 61 engage notches 62 to thereby provide a positive detent position in the tilting direction.

What is claimed is:

1. A mechanism for mounting an upper unit to a lower unit so as to allow relative motion between said two units along two generally orthogonal axes of rotation, said mechanism comprising:
   a partial sphere-shaped member protruding from the lower part of said upper unit;
   said partial sphere-shaped member containing a slot in which is held, in a moving relationship, a slider means for traversing said slot from one end to another, said slider means having an aperture therein;
   a circular rim-shaped member protruding from the upper part of said lower unit, for mating with said partial sphere-shaped member; and
   a stud means located within the periphery of said rim-shaped member, and fixed to said lower unit, said stud means passing through the aperture in said slider means and joined to said slider means so as to allow said slider, and consequently said upper unit, to pivot about said stud means, whereby said upper unit is supported by said rim-shaped member engaging said partial sphere-shaped member, said upper unit pivots about said stud means, said upper unit tilts by moving relative to said slider means, and said upper unit and said lower unit are in a captive arrangement;
   wherein said slider means is constructed so as to fit said slot that a first part of the slider means is on a first side of said slot, a second part of said slider means is on a second side of said slot, and a third part of said slider means passes through said slot and joins the first part of said slider means to the second part of said slider means and
   a bearing surface on the first part of the slider means mates against a bearing surface on a first surface of the partial sphere-shaped member, and
   a bearing surface on the second part of the slider means mates against a bearing surface on a second surface of the partial sphere-shaped member.

2. The mechanism of claim 1 further including a complementary formation on said slider and said partial sphere-shaped member for providing a detent function, wherein said formations are a notch and a projection.

3. The mechanism of claim 1 further including projections on said slider, for mating with corresponding notches on said partial sphere-shaped member so as to provide a detent function.

* * * * *